April 29, 1941.  H. C. RIGGS ET AL  2,240,461
FILLING AND VENTING PLUG FOR STORAGE BATTERY CELLS
Filed Dec. 7, 1938
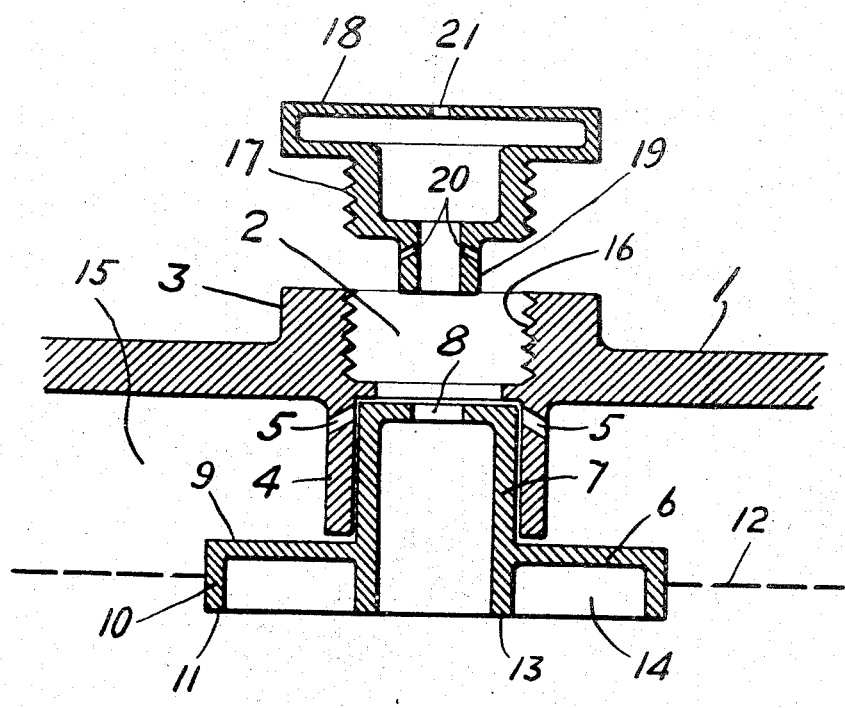
INVENTORS
Harold C. Riggs
William C. Leingang
BY
Augustus B. Stoughton
ATTORNEY.
WITNESS:

Patented Apr. 29, 1941

2,240,461

UNITED STATES PATENT OFFICE 2,240,461

FILLING AND VENTING PLUG FOR STORAGE BATTERY CELLS

Harold C. Riggs, Langhorne, and William C. Leingang, Philadelphia, Pa., assignors to The Electric Storage Battery Company, Philadelphia, Pa., a corporation of New Jersey Application December 7, 1938, Serial No. 244,320

2 Claims. (Cl. 136—178)

One object of our invention is to provide a float-operated, filling and venting structure for a storage battery cell.

More specifically, our invention consists in the provision of a storage battery cell having the customary filling and venting conduit or aperture passing through the cell cover to a point spaced from the under side of the cell cover. There is also an auxiliary vent or conduit passing through the cell cover and communicating with the interior of the cell at a point above the point of communication of the normal conduit or aperture and closely adjacent the under side of the cell cover. In the normal conduit or aperture, there is a float supported on the free surface of the electrolyte and adapted, when the customary vent plug is removed and the level of the electrolyte raised to the desired level, to close off the auxiliary conduit or aperture. When the vent plug is replaced in the normal conduit or aperture, it depresses the float and thereby opens the auxiliary conduit or aperture.

In the accompanying drawing, the single figure shows a vertical section of a portion of the cover of a battery cell with the filling vent and vent plug, the latter being removed from the vent opening.

In the selected embodiment of our device chosen for illustration and description, 1 is the cover of the cell through which passes a venting and filling duct 2 surrounded by the boss 3 above the upper surface of the cover and a cylindrical tube 4 below the under surface of the cover. Auxiliary vents 5 are shown passing through the tube 4 near the under surface of the cover, which vents, when open, permit gas trapped in the space under the cover to escape at such times as the level of the electrolyte is sufficiently high to prevent the escape of this gas through the opening 2. A float valve member 6 is shown having an upwardly extending cylindrical portion 7 loosely fitting within the tube 4 closed at its upper end except for the aperture 8, which aperture is sufficiently large to permit water to be added to the cell and to permit the insertion of the intake tube of a hydrometer syringe. Extending from the cylindrical member 7 and surrounding the same is a lateral disk-like extension 9 provided with a downwardly projecting annular portion 10 whose lower rim 11 lies in a plane just below the maximum desired level of the electrolyte as shown at 12. The tube 7 extends downwardly below the disk 9 and terminates in the plane of the lower edge 11 of the extension 10 as shown at 13. As a result of this configuration, there is provided an annular space 14 in which gas is trapped to provide sufficient buoyancy to lift the valve member 6 to its upper position in which it closes the vents 5 when the level of the electrolyte reaches the desired height during the filling operation. By closing these vents 5 gas is trapped in the space 15 under the cover, preventing the electrolyte from rising any further into this space. If the filling operation is continued, the level in the duct 2 will rise to a point where the surface can be observed and the filling operation will be stopped.

The boss 3 is provided with internal screw-threads 16 adapted to engage with the external threads 17 of the vent plug 18. This vent plug has a downwardly projecting, cylindrical extension 19 adapted to engage the upper surface of the tube 7 and depress the valve member 6 when the vent plug is inserted in the duct 2, thus opening the vents 5 and permitting the trapped gas in the space 15 to escape through vents 20 in the cylindrical extension 19 and thence through vent 21 into the atmosphere. The level of the liquid in the opening 2 will then drop to the normal electrolyte level 12, the latter rising slightly due to the addition of a small amount of liquid from the vent opening 2.

It will be understood that, because of the liquid held by capillary attraction in the space between the tube 7 and the inner wall of the duct 4, it will be necessary to provide only a loose fit between the tube 7 and the duct 4 in order to seal off the vents 5 when the valve member 6 is in its uppermost position.

We do not intend to be limited save as the scope of the prior art and of the attached claims may require.

We claim:

1. In a storage battery cell having a cover and containing electrolyte, a filling and venting structure comprising, in combination, a wall defining a filling and venting duct through the cell cover extending downwardly below the cover, an auxiliary vent through said wall at a point just below the under surface of the cover, a float valve member adapted to float on the surface of the electrolyte and having a portion loosely fitting with capillary clearance the inner surface of the wall of the duct and adapted to rise and fall with said electrolyte level and having an imperforate portion adapted to close and open said auxiliary vent, and a vent plug adapted to be inserted in said filling and venting duct and to engage said float valve to move it to the vent opening position, said float valve member being shaped to provide a passage for the introduction of liquid at the electrolyte level when the vent plug is removed.

2. In a storage battery containing liquid electrolyte spaced below its top, a filling and venting structure comprising, a cell cover for said battery having a filling and venting duct passing therethrough and communicating with the interior of the battery above the normal electrolyte level and below the under side of the cover, an auxiliary vent communicating with the interior of the cell just below the under side of the cover and above the point of communication of said duct and communicating with said duct above the point of communication of said duct with the interior of the cell, a float having sliding engagement with said duct and mounted on the free surface of the electrolyte and having an imperforate portion located above the free surface of the electrolyte and arranged to open and close said auxiliary vent and spaced from the walls of said duct a sufficient distance to provide for capillary attraction of electrolyte therebetween for sealing said vent when said float is in vent-closing position and having a perforation therethrough aligned with said duct for the admission of liquid to the battery at the normal electrolyte level, and a vent plug normally located in said duct and arranged to contact with and move said float to open said vent when the vent plug is in said normal position and to allow said float to close said vent when the vent plug is removed and the electrolyte is at its normal level.

HAROLD C. RIGGS.
WILLIAM C. LEINGANG.